(12) United States Patent
Delia et al.

(10) Patent No.: US 11,512,015 B2
(45) Date of Patent: Nov. 29, 2022

(54) METHOD AND APPARATUS FOR GLASS RIBBON THERMAL CONTROL

(71) Applicant: Corning Incorporated, Corning, NY (US)

(72) Inventors: Robert Delia, Horseheads, NY (US); Ahdi El-Kahlout, Lexington, KY (US); Soongyup Lee, Elgin, IL (US)

(73) Assignee: Corning Incorporated, Corning, NY (US)

( * ) Notice: Subject to any disclaimer, the term of this patent is extended or adjusted under 35 U.S.C. 154(b) by 737 days.

(21) Appl. No.: 16/463,529

(22) PCT Filed: Nov. 21, 2017

(86) PCT No.: PCT/US2017/062719
§ 371 (c)(1),
(2) Date: May 23, 2019

(87) PCT Pub. No.: WO2018/098125
PCT Pub. Date: May 31, 2018

(65) Prior Publication Data
US 2019/0375669 A1    Dec. 12, 2019

Related U.S. Application Data

(60) Provisional application No. 62/425,876, filed on Nov. 23, 2016.

(51) Int. Cl.
*C03B 25/12* (2006.01)
*C03B 17/06* (2006.01)

(52) U.S. Cl.
CPC ............ *C03B 17/067* (2013.01); *C03B 25/12* (2013.01); *C03B 17/064* (2013.01)

(58) Field of Classification Search
CPC ...... A24F 25/12; C03B 25/12; C03B 27/0522
See application file for complete search history.

(56) References Cited

U.S. PATENT DOCUMENTS

| 1,697,227 A | 1/1929 | Danner |
| 3,149,949 A | 9/1964 | Dockerty et al. |
| (Continued) | | |

FOREIGN PATENT DOCUMENTS

| CN | 101124173 A | 2/2008 |
| CN | 101175701 A | 5/2008 |
| (Continued) | | |

OTHER PUBLICATIONS

Chinese Patent Application No. 201780072640.5, Office Action dated Apr. 28, 2021, 12 pages (4 pages of English Translation and 8 pages of Original Document), Chinese Patent Office.

(Continued)

*Primary Examiner* — Cynthia Szewczyk
(74) *Attorney, Agent, or Firm* — Matthew J. Mason

(57) ABSTRACT

A method and apparatus for manufacturing a glass article includes flowing a glass ribbon through a housing having first and second side walls. The first and second side walls extend between the glass ribbon and a cooling mechanism and at least one of the side walls has at least one closeable opening, such that a greater amount of heat is transferred from the glass ribbon when the closeable opening is open than when the closeable opening is closed.

19 Claims, 4 Drawing Sheets

(56) References Cited

U.S. PATENT DOCUMENTS

| | | | |
|---|---|---|---|
| 8,113,015 | B2 | 2/2012 | Burdette |
| 8,453,478 | B2 | 6/2013 | Tsuda et al. |
| 9,296,635 | B2 | 3/2016 | Chalk et al. |
| 9,598,301 | B2 | 3/2017 | Fournel |
| 9,676,648 | B2 | 6/2017 | Panin |
| 9,796,616 | B2 | 10/2017 | Coppola et al. |
| 9,802,851 | B2 | 10/2017 | Pitbladdo |
| 9,919,944 | B2 | 3/2018 | Geathers et al. |
| 9,938,177 | B2 | 4/2018 | Welles |
| 2006/0081009 | A1 | 4/2006 | Maldonado |
| 2007/0140311 | A1 | 6/2007 | House et al. |
| 2008/0047300 | A1 | 2/2008 | Rhoads |
| 2009/0019892 | A1 | 1/2009 | Fredholm et al. |
| 2012/0318020 | A1 | 12/2012 | Delia et al. |
| 2013/0133368 | A1 | 5/2013 | Fournel |
| 2013/0133370 | A1 | 5/2013 | Boratav et al. |
| 2014/0318182 | A1 | 10/2014 | Coppola et al. |
| 2016/0046518 | A1 | 2/2016 | Geathers et al. |
| 2016/0107916 | A1* | 4/2016 | Welles .................. C03B 17/067 65/195 |
| 2017/0369353 | A1 | 12/2017 | Delia et al. |
| 2018/0079675 | A1* | 3/2018 | Afzal ..................... C03B 25/08 |

FOREIGN PATENT DOCUMENTS

| | | | | |
|---|---|---|---|---|
| CN | 100534938 | C | 9/2009 | |
| CN | 101125727 | B | 7/2010 | |
| CN | 101928100 | A | 12/2010 | |
| CN | 102180588 | A | 9/2011 | |
| CN | 102471121 | A | 5/2012 | |
| CN | 102906034 | A | 1/2013 | |
| CN | 101891375 | B | 7/2013 | |
| CN | 103608307 | A | 2/2014 | |
| CN | 104010981 | A | 8/2014 | |
| CN | 104169228 | A | 11/2014 | |
| CN | 104203846 | A | 12/2014 | |
| CN | 203976606 | U | 12/2014 | |
| CN | 104478197 | A | 4/2015 | |
| CN | 102725238 | B | 7/2015 | |
| CN | 102329070 | B | 2/2016 | |
| CN | 105307988 | A | 2/2016 | |
| CN | 103508658 | B | 5/2016 | |
| DE | 102008063554 | A1 | 6/2010 | |
| EP | 2253598 | B1 | 5/2014 | |
| GB | 245362 | A | 1/1926 | |
| JP | 2001031434 | A | 2/2001 | |
| JP | 2008-516888 | A | 5/2008 | |
| JP | 2010269998 | A * | 12/2010 | ........... C03B 17/064 |
| JP | 2011-116641 | A | 6/2011 | |
| JP | 2014-518190 | A | 7/2014 | |
| JP | 2015-500786 | A | 1/2015 | |
| JP | 2015-504411 | A | 2/2015 | |
| JP | 2015124143 | A | 7/2015 | |
| JP | 2015160797 | A | 9/2015 | |
| JP | 2016-523219 | A | 8/2016 | |
| TW | 201328992 | A | 7/2013 | |
| TW | 201500302 | A | 1/2015 | |
| WO | 2011/007617 | A1 | 1/2011 | |
| WO | 2012/174353 | A2 | 12/2012 | |
| WO | 2013011835 | A1 | 1/2013 | |
| WO | WO-2013082360 | A1 * | 6/2013 | ........... C03B 17/064 |
| WO | 2014051069 | A1 | 4/2014 | |
| WO | 2014/193780 | A1 | 12/2014 | |
| WO | WO-2018160452 | A1 * | 9/2018 | ........... C03B 17/064 |

OTHER PUBLICATIONS

Japanese Patent Application No. 2019-527850, Office Action dated Sep. 8, 2021, 12 pages (6 pages of English Translation and 6 pages of Original Document); Japanese Patent Office.

Taiwanese Patent Application No. 106140688, Office Action dated Jun. 22, 2021, 3 pages (English Translation Only); Taiwanese Patent Office.

International Search Report and Written Opinion of the International Searching Authority; PCT/US2017/062719; dated Mar. 22, 2018; 13 Pages; Korean Intellectual Property Office.

* cited by examiner

METHOD AND APPARATUS FOR GLASS RIBBON THERMAL CONTROL

This application claims the benefit of priority under 35 U.S.C. § 371 of International Patent Application Ser. No. PCT/US2017/062719 filed on Nov. 21, 2017, which claims to benefit of priority to U.S. Provisional Application Ser. No. 62/425,876, filed on Nov. 23, 2016, the content of each are relied upon and incorporated herein by reference in their entirety.

FIELD

The present disclosure relates generally to methods and apparatuses for manufacturing glass articles and more particularly to methods and apparatuses that provide improved thermal control of glass ribbons in the manufacture of glass articles.

BACKGROUND

In the production of glass articles, such as glass sheets for display applications, including televisions and hand held devices, such as telephones and tablets, the glass articles can be produced from a ribbon of glass that continuously flows through a housing. The housing can include an upper wall section that provides physical separation between the glass ribbon and processing equipment, such as heating and cooling equipment. This upper wall section can not only act as a physical barrier to protect such equipment but can also provide a thermal effect in smoothing thermal gradients experienced by the glass ribbon. This thermal effect is believed to affect certain glass properties such as thickness uniformity and surface flatness or waviness. However, the physical barrier between the glass ribbon and processing equipment, such as cooling equipment, minimizes the heat removal capacity of that equipment. Such heat removal becomes increasingly important at elevated glass flow rates, for glasses with low specific heat capacity and/or emissivity, and/or relatively cold ribbon temperatures. Accordingly, under such conditions, it would be desirable to increase the heat removal of the glass ribbon while not adversely affecting at least one glass qualities such as thickness uniformity, surface flatness, and waviness.

SUMMARY

Embodiments disclosed herein include an apparatus for manufacturing a glass article. The housing includes a first side wall and a second side wall, wherein the first and second side walls are configured to extend between a glass ribbon and the cooling mechanism. The apparatus also includes at least one closeable opening in at least one of the first and second side walls, wherein the closeable opening and the cooling mechanism are configured to allow a greater amount of heat to be transferred from the glass ribbon when the closeable opening is open than when the closeable opening is closed.

Embodiments disclosed herein also include a method for manufacturing a glass article. The method includes flowing a glass ribbon through a housing that includes a first side wall and a second side wall. The first and second side walls extend between the glass ribbon and a cooling mechanism and at least one of the first and second side walls comprises at least one closeable opening, such that a greater amount of heat is transferred from the glass ribbon when the closeable opening is open than when the closeable opening is closed.

Additional features and advantages of the embodiments disclosed herein will be set forth in the detailed description which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Figure 1:
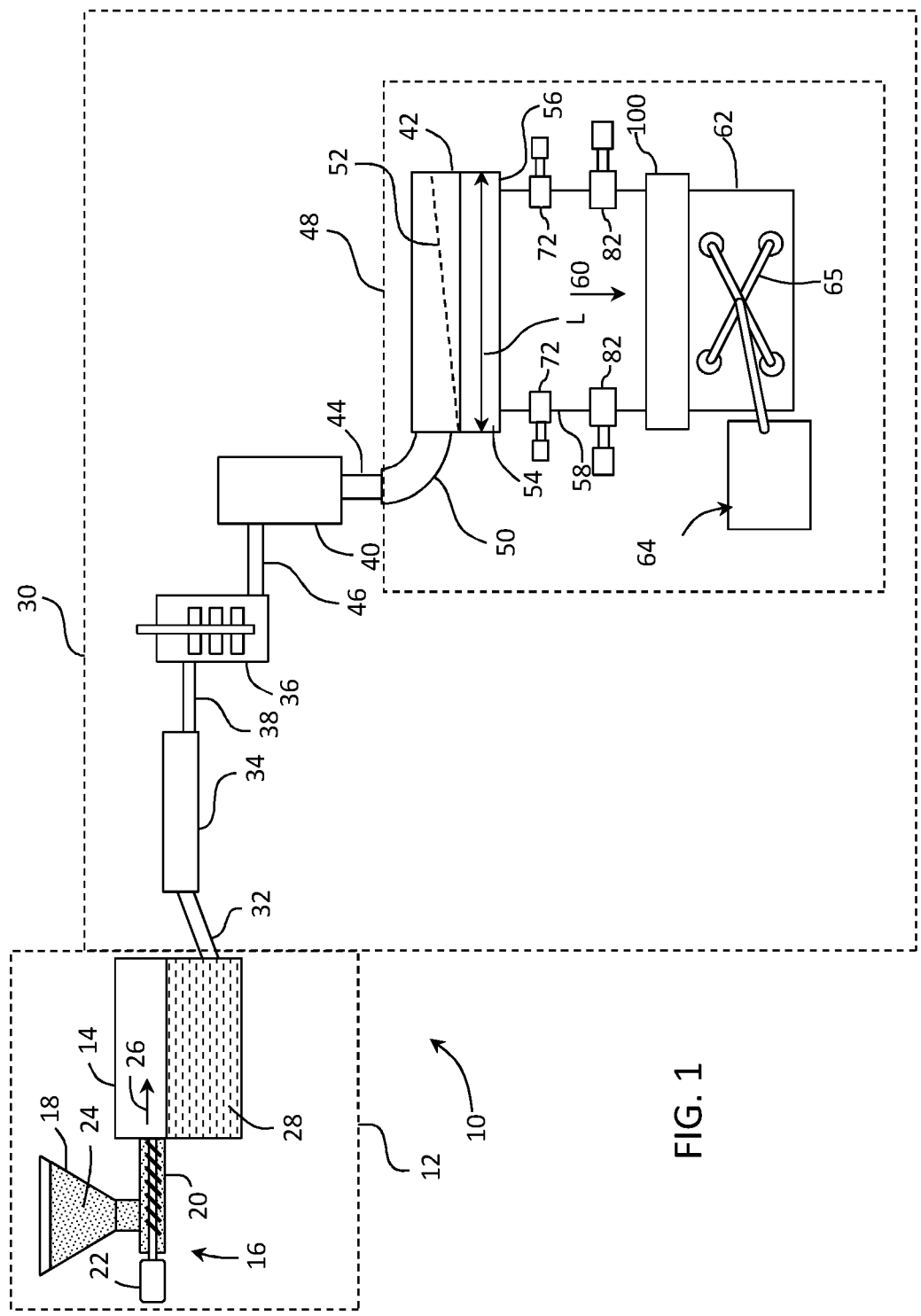
FIG. 1 is a schematic view of an example fusion down draw glass-making apparatus and process.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, for example by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "heating mechanism" refers to a mechanism that provides reduced heat transfer from at least a portion of the glass ribbon relative to a condition where such heating mechanism is absent. The reduced heat transfer could occur through at least one of conduction, convection, and radiation. For example, the heating mechanism could provide for a reduced temperature differential between at least a portion of the glass ribbon and its environment relative to a condition where such heating mechanism is absent.

As used herein, the term "cooling mechanism" refers to a mechanism that provides increased heat transfer from at least a portion of the glass ribbon relative to a condition where such cooling mechanism is absent. The increased heat transfer could occur through at least one of conduction, convection, and radiation. For example, the cooling mechanism could provide for an increased temperature differential between at least a portion of the glass ribbon and its environment relative to a condition where such cooling mechanism is absent.

As used herein, the term "housing" refers to an enclosure in which a glass ribbon is formed, wherein as the glass ribbon travels through the housing, it generally cools from a relatively higher to relatively lower temperature. While embodiments disclosed herein have been described with reference to a fusion down draw process, wherein a glass ribbon flows down through the housing in a generally vertical direction, it is to be understood that such embodiments are also applicable to other glass forming processes, such as float processes, slot draw processes, up-draw processes, and press-rolling processes, wherein the glass ribbon may flow through the housing in a variety of directions, such as a generally vertical direction or a generally horizontal direction.

As used herein, the term "closeable opening" refers to an opening of a side wall of a glass manufacturing apparatus that may be closed, for example, with a plug having the same approximate shape as the closeable opening so as to snugly and securely yet removably and reinsertively fit within each closeable opening. The closeable opening may also be closed, for example, with a door, such as a sliding or hinged door, that can be repeatedly opened or closed over the closeable opening.

Shown in FIG. 1 is an exemplary glass manufacturing apparatus 10. In some examples, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners or electrodes) that heat raw materials and convert the raw materials into molten glass. In further examples, glass melting furnace 12 may include thermal management devices (e.g., insulation components) that reduce heat lost from a vicinity of the melting vessel. In still further examples, glass melting furnace 12 may include electronic devices and/or electromechanical devices that facilitate melting of the raw materials into a glass melt. Still further, glass melting furnace 12 may include support structures (e.g., support chassis, support member, etc.) or other components.

Glass melting vessel 14 is typically comprised of refractory material, such as a refractory ceramic material, for example a refractory ceramic material comprising alumina or zirconia. In some examples glass melting vessel 14 may be constructed from refractory ceramic bricks. Specific embodiments of glass melting vessel 14 will be described in more detail below.

In some examples, the glass melting furnace may be incorporated as a component of a glass manufacturing apparatus to fabricate a glass substrate, for example a glass ribbon of a continuous length. In some examples, the glass melting furnace of the disclosure may be incorporated as a component of a glass manufacturing apparatus comprising a slot draw apparatus, a float bath apparatus, a down-draw apparatus such as a fusion process, an up-draw apparatus, a press-rolling apparatus, a tube drawing apparatus or any other glass manufacturing apparatus that would benefit from the aspects disclosed herein. By way of example, FIG. 1 schematically illustrates glass melting furnace 12 as a component of a fusion down-draw glass manufacturing apparatus 10 for fusion drawing a glass ribbon for subsequent processing into individual glass sheets.

The glass manufacturing apparatus 10 (e.g., fusion down-draw apparatus 10) can optionally include an upstream glass manufacturing apparatus 16 that is positioned upstream relative to glass melting vessel 14. In some examples, a portion of, or the entire upstream glass manufacturing apparatus 16, may be incorporated as part of the glass melting furnace 12.

As shown in the illustrated example, the upstream glass manufacturing apparatus 16 can include a storage bin 18, a raw material delivery device 20 and a motor 22 connected to the raw material delivery device. Storage bin 18 may be configured to store a quantity of raw materials 24 that can be fed into melting vessel 14 of glass melting furnace 12, as indicated by arrow 26. Raw materials 24 typically comprise one or more glass forming metal oxides and one or more modifying agents. In some examples, raw material delivery device 20 can be powered by motor 22 such that raw material delivery device 20 delivers a predetermined amount of raw materials 24 from the storage bin 18 to melting vessel 14. In further examples, motor 22 can power raw material delivery device 20 to introduce raw materials 24 at a controlled rate based on a level of molten glass sensed downstream from melting vessel 14. Raw materials 24 within melting vessel 14 can thereafter be heated to form molten glass 28.

Glass manufacturing apparatus 10 can also optionally include a downstream glass manufacturing apparatus 30 positioned downstream relative to glass melting furnace 12. In some examples, a portion of downstream glass manufacturing apparatus 30 may be incorporated as part of glass melting furnace 12. In some instances, first connecting conduit 32 discussed below, or other portions of the downstream glass manufacturing apparatus 30, may be incorporated as part of glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, or alloys thereof. For example, downstream components of the glass manufacturing apparatus may be formed from a platinum-rhodium alloy including from about 70 to about 90% by weight platinum and about 10% to about 30% by weight rhodium. However, other suitable metals can include molybdenum, palladium, rhenium, tantalum, titanium, tungsten and alloys thereof.

Downstream glass manufacturing apparatus 30 can include a first conditioning (i.e., processing) vessel, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may cause molten glass 28 to pass through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated to continue the melting process, or cooled to a temperature lower than the temperature of the molten glass in the melting vessel before entering the fining vessel.

Bubbles may be removed from molten glass 28 within fining vessel 34 by various techniques. For example, raw materials 24 may include multivalent compounds (i.e. fining agents) such as tin oxide that, when heated, undergo a chemical reduction reaction and release oxygen. Other suitable fining agents include without limitation arsenic, antimony, iron and cerium. Fining vessel 34 is heated to a temperature greater than the melting vessel temperature, thereby heating the molten glass and the fining agent. Oxygen bubbles produced by the temperature-induced chemical reduction of the fining agent(s) rise through the molten glass within the fining vessel, wherein gases in the molten glass produced in the melting furnace can diffuse or coalesce into the oxygen bubbles produced by the fining agent. The enlarged gas bubbles can then rise to a free surface of the molten glass in the fining vessel and thereafter be vented out of the fining vessel. The oxygen bubbles can further induce mechanical mixing of the molten glass in the fining vessel.

Downstream glass manufacturing apparatus 30 can further include another conditioning vessel such as a mixing vessel 36 for mixing the molten glass. Mixing vessel 36 may be located downstream from the fining vessel 34. Mixing vessel 36 can be used to provide a homogenous glass melt composition, thereby reducing cords of chemical or thermal inhomogeneity that may otherwise exist within the fined molten glass exiting the fining vessel. As shown, fining vessel 34 may be coupled to mixing vessel 36 by way of a second connecting conduit 38. In some examples, molten glass 28 may be gravity fed from the fining vessel 34 to mixing vessel 36 by way of second connecting conduit 38. For instance, gravity may cause molten glass 28 to pass through an interior pathway of second connecting conduit 38 from fining vessel 34 to mixing vessel 36. It should be noted that while mixing vessel 36 is shown downstream of fining vessel 34, mixing vessel 36 may be positioned upstream from fining vessel 34. In some embodiments, downstream glass manufacturing apparatus 30 may include multiple mixing vessels, for example a mixing vessel upstream from fining vessel 34 and a mixing vessel downstream from fining vessel 34. These multiple mixing vessels may be of the same design, or they may be of different designs.

Downstream glass manufacturing apparatus 30 can further include another conditioning vessel such as delivery vessel 40 that may be located downstream from mixing vessel 36. Delivery vessel 40 may condition molten glass 28 to be fed into a downstream forming device. For instance, delivery vessel 40 can act as an accumulator and/or flow controller to adjust and/or provide a consistent flow of molten glass 28 to forming body 42 by way of exit conduit 44. As shown, mixing vessel 36 may be coupled to delivery vessel 40 by way of third connecting conduit 46. In some examples, molten glass 28 may be gravity fed from mixing vessel 36 to delivery vessel 40 by way of third connecting conduit 46. For instance, gravity may drive molten glass 28 through an interior pathway of third connecting conduit 46 from mixing vessel 36 to delivery vessel 40.

Downstream glass manufacturing apparatus 30 can further include forming apparatus 48 comprising the above-referenced forming body 42 and inlet conduit 50. Exit conduit 44 can be positioned to deliver molten glass 28 from delivery vessel 40 to inlet conduit 50 of forming apparatus 48. For example in examples, exit conduit 44 may be nested within and spaced apart from an inner surface of inlet conduit 50, thereby providing a free surface of molten glass positioned between the outer surface of exit conduit 44 and the inner surface of inlet conduit 50. Forming body 42 in a fusion down draw glass-making apparatus can comprise a trough 52 positioned in an upper surface of the forming body and converging forming surfaces 54 that converge in a draw direction along a bottom edge 56 of the forming body. Molten glass delivered to the forming body trough via delivery vessel 40, exit conduit 44 and inlet conduit 50 overflows side walls of the trough and descends along the converging forming surfaces 54 as separate flows of molten glass. The separate flows of molten glass join below and along bottom edge 56 to produce a single ribbon of glass 58 that is drawn in a draw or flow direction 60 from bottom edge 56 by applying tension to the glass ribbon, such as by gravity, edge rolls 72 and pulling rolls 82, to control the dimensions of the glass ribbon as the glass cools and a viscosity of the glass increases. Accordingly, glass ribbon 58 goes through a visco-elastic transition and acquires mechanical properties that give the glass ribbon 58 stable dimensional characteristics. Glass ribbon 58 may, in some embodiments, be separated into individual glass sheets 62 by a glass separation apparatus 100 in an elastic region of the glass ribbon. A robot 64 may then transfer the individual glass sheets 62 to a conveyor system using gripping tool 65, whereupon the individual glass sheets may be further processed.

Figure 2:
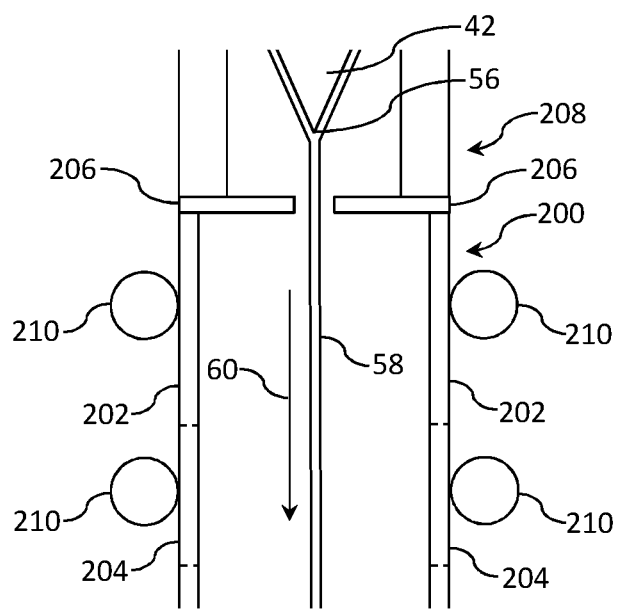
FIG. 2 is an end cutaway schematic view of a glass ribbon forming apparatus and process including a cooling mechanism that includes conduits with a cooling fluid flowing therethrough in accordance with embodiments disclosed herein.

FIG. 2 is an end cutaway schematic view of a glass ribbon forming apparatus and process including a cooling mechanism that includes conduits 210 with a cooling fluid flowing therethrough in accordance with embodiments disclosed herein. Specifically, in the embodiment shown in FIG. 2, glass ribbon 58 flows in draw or flow direction 60 below bottom edge 56 of forming body 42 and between first and second side walls 202 of a housing 200. Housing 200 can be generally separated from forming body enclosure 208 by separation members 206, wherein, with reference to draw or flow direction 60 of glass ribbon 58, housing 200 is downstream relative to forming body enclosure 208.

In the embodiment shown in FIG. 2, first and second side walls 202 are configured to extend between glass ribbon 58 and conduits 210. Each of first and second side walls 202 includes a closeable opening 204. Each closeable opening 204 can be independently open or closed (e.g., with a plug as described in more detail below) depending on the desired amount of heat transfer from the glass ribbon 58. Specifically, a greater amount of heat is transferred from the glass ribbon 58 when the closeable opening 204 is open than when the closeable opening 204 is closed.

As noted above, the cooling mechanism illustrated in FIG. 2 includes conduits 210 with a cooling fluid flowing therethrough. As shown in FIG. 2, conduits 210 are each situated in relatively close proximity to each of first and second side walls 202, wherein, with reference to a draw or flow direction 60 of the glass ribbon 58, one of the conduits 210 is situated upstream of the other conduit 210. More particularly, as shown in FIG. 2, conduits 210 are each situated in relatively close proximity to each of first and second side walls 202, wherein, with reference to a draw or flow direction 60 of the glass ribbon 58, a first of the conduits 210 is situated upstream of the closeable opening 204 and a second of the conduits 210 is situated downstream of the first of the conduits 210 in a position that allows for a direct view between the second of the conduits 210 and the glass ribbon 58 when the closeable opening 204 is open. A direct view between the second of the conduits 210 and the glass ribbon 58 when the closeable opening 204 is open, as shown in FIG. 2, allows for increased heat transfer, particularly radiation heat transfer, between the glass ribbon 58 and the second of the conduits 210 as compared to a condition where the closeable opening 204 is closed.

Figure 4:
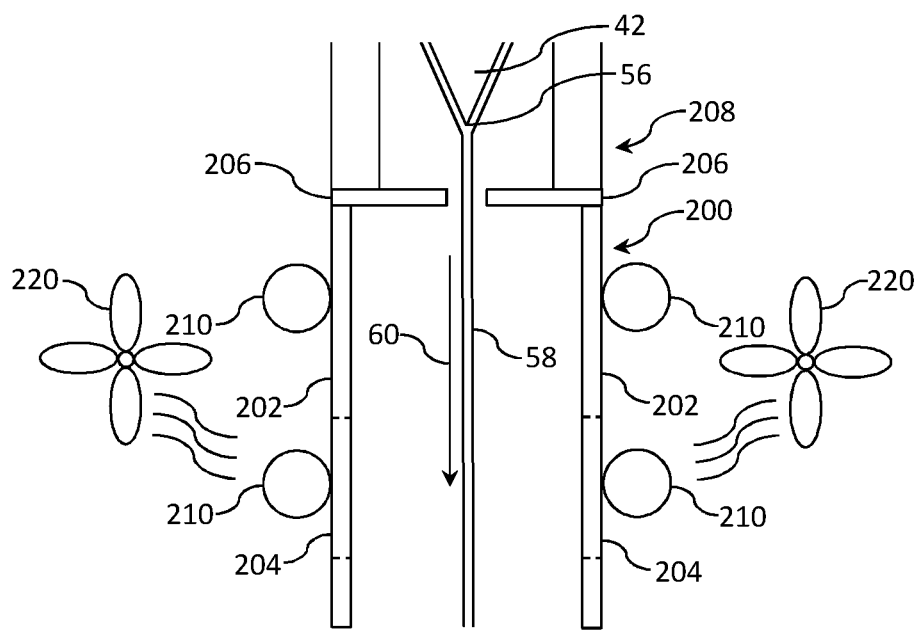
FIG. 4 is an end cutaway schematic view of a glass ribbon forming apparatus and process including a cooling mechanism that includes both a convective cooling mechanism and conduits with a cooling fluid flowing therethrough in accordance with embodiments disclosed herein.

In certain exemplary embodiments, the cooling fluid flowing through conduit 210 can comprise a liquid, such as water. In certain exemplary embodiments, the cooling fluid flowing through conduit 210 can comprise a gas, such as air. And while FIGS. 2 and 4 show conduits 210 with a generally circular cross section, it is to be understood that embodiments disclosed herein include those in which conduits have other cross-sectional geometries such as elliptical or polygonal. Moreover, it is to be understood that embodiments disclosed herein include those in which the diameter or cross-sectional area of each conduit 210 is approximately the same or varies along its longitudinal length, depending on the desired amount of heat transfer from the glass ribbon 58, such as when differing amounts of heat transfer are desired from the glass ribbon 58 in its widthwise direction. In addition, embodiments disclosed herein include those in which the longitudinal length of each conduit 210 is the same or different and may or may not entirely extend across the glass ribbon 58 in its widthwise direction.

Exemplary materials for conduits 210 include those that possess good mechanical and oxidation properties at elevated temperatures, including various steel alloys, including stainless steel, such as 300 series stainless steel.

Embodiments disclosed herein also include those in which a high emissivity coating is deposited on at least part of an outside surface of each conduit 210 in order to affect the radiation heat transfer between the glass ribbon 58 and the conduit 210, wherein the same or different coatings may be deposited on the outside surface of each conduit 210 along its longitudinal length, depending on the desired amount of heat transfer from the glass ribbon 58. Exemplary high emissivity coatings should be stable at elevated temperatures and have good adherence to materials such as stainless steel. An exemplary high emissivity coating is M700 Black coating available from Cetek.

Each conduit 210 can include one or more fluid channels extending along at least a portion of their longitudinal lengths, including embodiments in which at least one channel circumferentially surrounds at least one other channel, such as when a cooling fluid is introduced into the conduit at a first end, flows along at least a portion of the longitudinal length of the conduit along a first channel and then flows back to the first end of the conduit along a second channel that either circumferentially surrounds or is circumferentially surrounded by the first channel. These and additional exemplary embodiments of conduits 210 are, for example, described in WO2006/044929A1, the entire disclosure of which is incorporated herein by reference.

Figure 3:
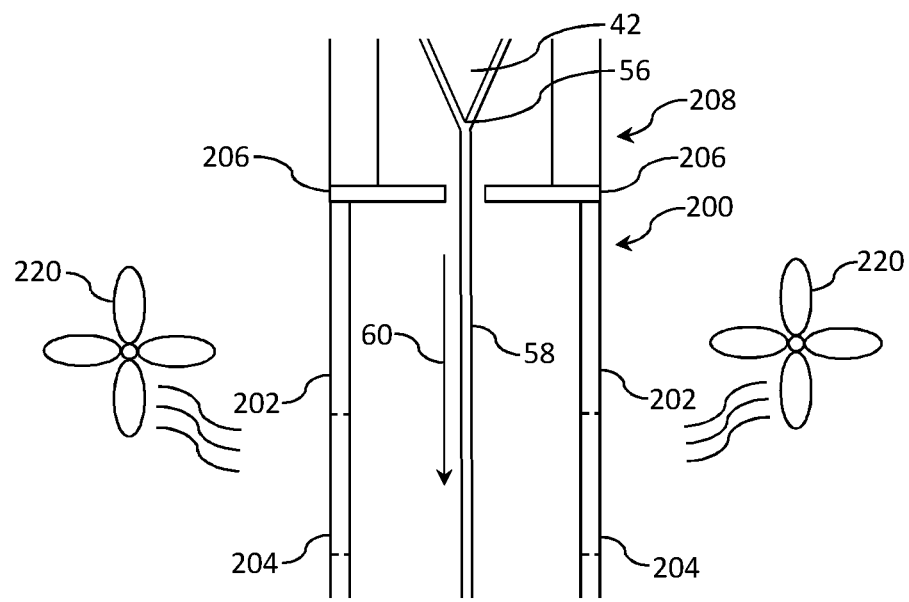
FIG. 3 is an end cutaway schematic view of a glass ribbon forming apparatus and process including a convective cooling mechanism.

FIG. 3 is an end cutaway schematic view of a glass ribbon forming apparatus and process including a cooling mechanism that includes a convective cooling mechanism, illustrated by cooling fans 220. In the embodiment shown in FIG. 3, first and second side walls 202 are configured to extend between glass ribbon 58 and conductive cooling mechanism.

Convective cooling mechanism, such as cooling fans 220, can provide an increased velocity of air flow outside of housing 200, which can, in turn, provide a Bernoulli effect driven pressure differential between an area inside and outside of housing 200, thereby effecting increased convective heat transfer from the glass ribbon 58. As with the embodiment illustrated in FIG. 2, each of first and second side walls 202 includes a closeable opening 204. Each closeable opening 204 can be independently open or closed (e.g., with a plug as described in more detail below) depending on the desired amount of heat transfer from the glass ribbon 58. Specifically, a greater amount of heat is transferred from the glass ribbon 58 when the closeable opening 204 is open than when the closeable opening 204 is closed.

In certain exemplary embodiments, convective cooling mechanism can include at least one vacuum port configured to promote convection cooling of the glass ribbon 58 with a cooling fluid flow generated at least partially by operation of the vacuum port. The vacuum port or ports can generate at least a partial vacuum outside of housing 200, which can, in turn, create a pressure differential between an area inside and outside of housing 200, thereby enhancing air current generation and increasing convective heat transfer from the glass ribbon 58.

Figure 8:
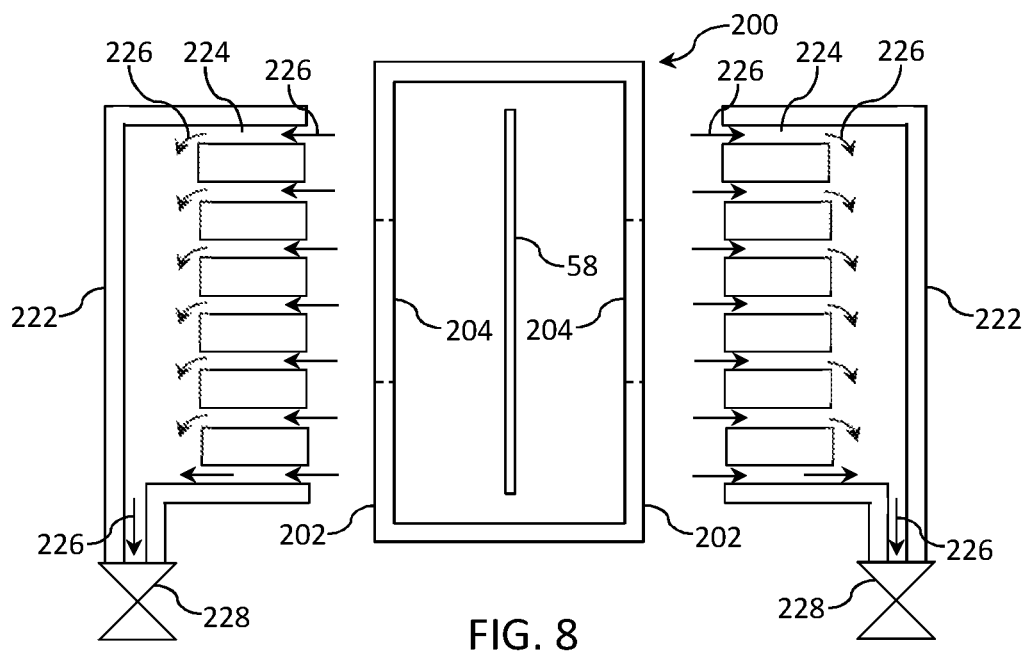
FIG. 8 illustrates a top cutaway schematic view of a glass ribbon forming apparatus and process including a cooling mechanism that includes a plurality of vacuum ports and an adjustable flow control device in accordance with embodiments disclosed herein.

For example, as illustrated in FIG. 8. In certain exemplary embodiments, the convective cooling mechanism can include vacuum cooling mechanism 222 that includes a plurality of vacuum ports 224 extending in the same direction as the widthwise direction of the glass ribbon 58, thereby enabling fluid flow in the directions illustrated by arrows 226. In such embodiments, the vacuum cooling mechanism 222 can include at least one adjustable flow control device, such as valves 228, configured to adjust fluid flow through the vacuum cooling mechanism 222. Moreover, in certain exemplary embodiments, each of the plurality of vacuum ports 224 can include an adjustable flow control device, such as a valve, configured to independently adjust fluid flow through the corresponding vacuum port (not shown). These and additional exemplary embodiments of vacuum ports are, for example, described in WO2014/193780A1, the entire disclosure of which is incorporated herein by reference.

FIG. 4 is an end cutaway schematic view of a glass ribbon forming apparatus and process including a cooling mechanism that includes both a convective cooling mechanism, illustrated by cooling fans 220, and conduits 210 with a cooling fluid flowing therethrough in accordance with embodiments disclosed herein. As with the embodiments illustrated in FIGS. 2 and 3, each of first and second side walls 202 includes a closeable opening 204. Each closeable opening 204 can be independently open or closed (e.g., with a plug as described in more detail below) depending on the desired amount of heat transfer from the glass ribbon 58. The embodiment illustrated in FIG. 4 can include all of the embodiments and sub-embodiments described above with reference to FIGS. 2 and 3, including all embodiments and sub-embodiments relating to conduits 210 and convective cooling mechanisms.

Embodiments disclosed herein can also include alternative or additional cooling mechanisms such as, for example, a cooling mechanism that utilizes an evaporative cooling effect to for the purposes of enhancing heat transfer, such as radiation heat transfer, from the glass ribbon 58. While the position of such cooling mechanisms is not limited, in certain exemplary embodiments, at least one of such mechanisms can be positioned at or near one or more locations indicated by conduits 210 in FIGS. 2 and 4.

Such cooling mechanisms can, for example, include an evaporator unit that includes a liquid reservoir configured to receive a working liquid, such as water, and a heat transfer element configured to be placed in thermal contact with the working liquid received in the liquid reservoir, wherein the heat transfer element can be configured to cool the glass ribbon 58 by receiving radiant heat from the glass ribbon 58 and transferring the heat to the working liquid received in the liquid reservoir, thereby transforming an amount of the working liquid to a vapor. These and additional exemplary embodiments of cooling mechanisms utilizing an evaporative cooling effect are, for example, described in US2016/0046518A1, the entire disclosure of which is incorporated herein by reference.

Other cooling mechanisms that can be used with embodiments disclosed herein include those that include a plurality of cooling coils positioned along a cooling axis extending transverse to a flow direction 60 of the glass ribbon 58, such as those, for example, described in WO2012/174353A2, the entire disclosure of which is incorporated herein by reference. Such cooling coils could be used in combination with and/or in substitution for conduits 210.

Each closeable opening 204, when closed, may be plugged with a plug having the same approximate shape as the closeable opening 204 so as to snugly and securely yet removably and reinsertively fit within each closeable opening 204. Each plug may comprise a material or materials that is the same or different than the material or materials comprising first and second side walls 202. In certain exemplary embodiments, each plug and each of first and second side walls 202 comprise a material having relatively high thermal conductivity at elevated temperatures while maintaining high mechanical integrity such temperatures, such as temperatures above about 750° C. Exemplary materials for plugs and first and second side walls 202 can include at least one of various grades of silicon carbide, alumina refractories, zircon-based refractories, titanium-based steel alloys, and nickel-based steel alloys.

Figure 5A:
FIGS. 5A, 5B, and 5C each respectively illustrate side perspective views of closeable openings in accordance with embodiments disclosed herein.
Figure 5B:
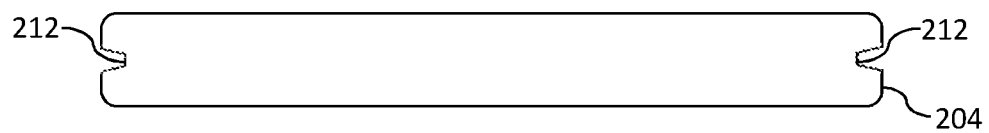
Figure 5C:
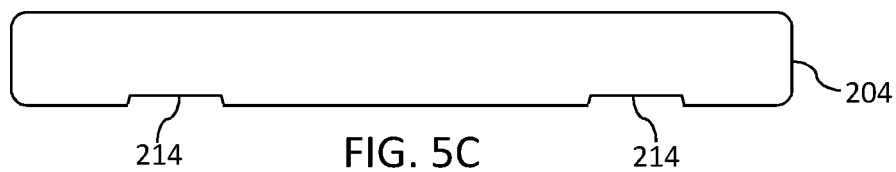

FIGS. 5A-5C each respectively illustrate side perspective views of exemplary closeable openings 204 in accordance with embodiments disclosed herein, wherein the longest dimension of each closeable opening 204 extends in the same direction as the widthwise direction of the glass ribbon 58. As noted above, each closeable opening 204 corresponds to a plug having the same approximate shape as the closeable opening 204 so as to snugly and securely yet removably and reinsertively fit within each closeable opening 204. In the embodiment illustrated in FIG. 5A, closeable opening 204 is rectangular shaped with rounded corners. In the embodiment illustrated in FIG. 5B, closeable opening 204 is otherwise similar to the closeable opening illustrated in FIG. 5A, but also includes tabs 212 on each end. In the embodiment illustrated in FIG. 5C, closeable opening is also otherwise similar to the closeable opening illustrated in FIG. 5A, but also 204 includes tabs 214 on its downstream edge relative to the flow direction 60 of the glass ribbon 58. Tabs 212 and 214 correspond to notches or grooves in corresponding plugs and can aid in fitting and securing plugs within closeable openings 204.

While FIGS. 5A-5C show rectangular shaped closeable openings 204, it is to be understood that other shapes such as square, circular, elliptical, triangular, and polygonal with five or more sides are also within the scope of the present disclosure. In addition, while 5A-5C show rectangular shapes with a specific aspect ratio, it is to be understood that embodiments disclosed herein include closeable openings 204 having a variety of aspect ratios, such as rectangular shapes having aspect ratios of the longest to shortest sides ranging from about 20:1 to about 1.5:1, such as from about 10:1 to about 2:1, and further such as from about 8:1 to about 3:1 and all ranges and sub-ranges in between Embodiments disclosed herein also include those in which at least one of first of second side walls 202, including both of first and second side walls 202, include(s) at least two closeable openings 204 that can each be independently opened or closed (e.g., with a plug) depending on the desired amount of heat transfer from the glass ribbon 58. For example, embodiments disclosed herein include those in which at least one of first and second side walls 202 includes two or more closeable openings 204 wherein, with reference to a flow direction 60 of the glass ribbon 58, the closeable openings 204 are configured to be positioned upstream and downstream of each other (i.e., in the vertical direction relative to each other when the glass ribbon 58 is drawn in the downward direction). Embodiments disclosed herein also include those in which at least one of first and second side walls 202 includes two or more closeable openings 204 wherein the closeable openings 204 are configured to extend end to end along a widthwise direction of the glass ribbon 58 (i.e., in the horizontal direction relative to each other when the glass ribbon 58 is drawn in the downward direction).

Figure 6:
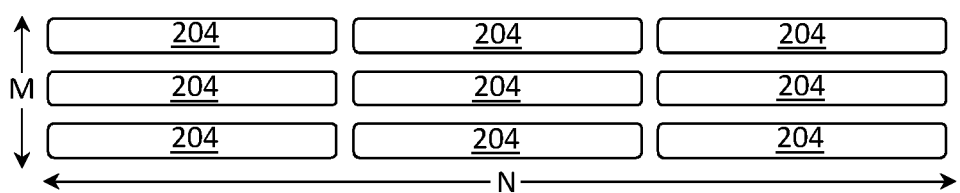
FIG. 6 illustrates a side perspective view of a matrix of closeable openings in accordance with embodiments disclosed herein.

FIG. 6 illustrates a side perspective view of a matrix of closeable openings 204 in accordance with embodiments disclosed herein. Specifically, FIG. 6 illustrates an M×N matrix of closeable openings 204 that can each be independently opened or closed (e.g., with a plug) depending on the desired amount of heat transfer from the glass ribbon 58, wherein M refers to the number of closeable openings 204 that are, with reference to a flow direction 60 of the glass ribbon 58, configured to be positioned upstream and downstream of each other (i.e., in the vertical direction relative to each other when the glass ribbon 58 is drawn in the downward direction) and N refers to the number of closeable openings 204 that are configured to extend end to end along a widthwise direction of the glass ribbon 58 (i.e., in the horizontal direction relative to each other when the glass ribbon 58 is drawn in the downward direction). While in the embodiment illustrated in FIG. 6, each of M and N equal three, it is to be understood that embodiments disclosed herein can, for example, include matrices wherein each of M and N are at least one, such as at least two, wherein M and N can be the same or different from each other.

Figure 7:
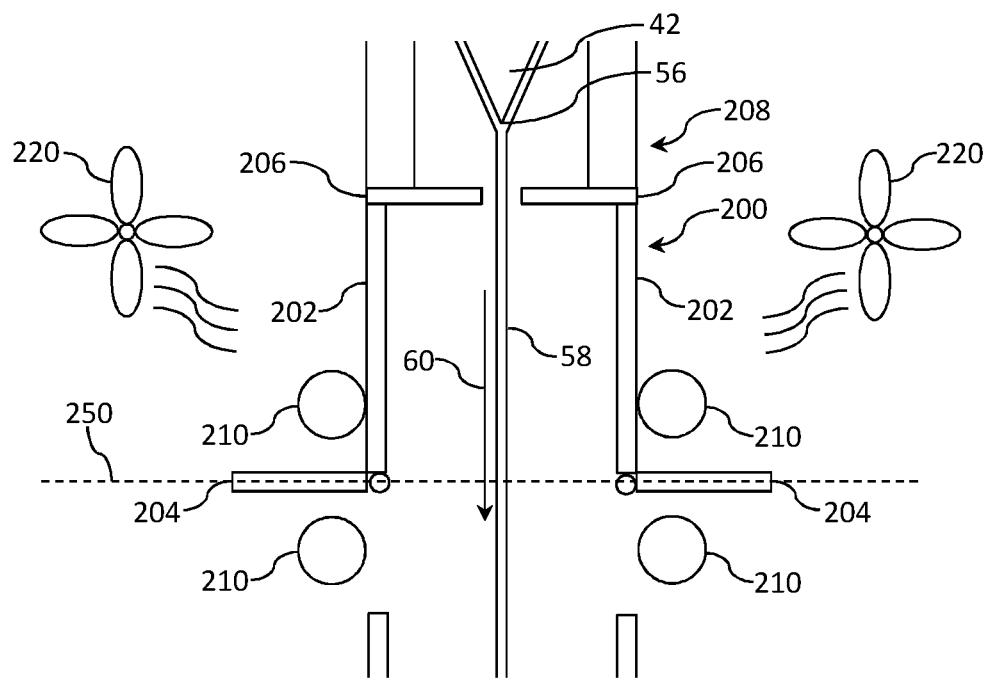
FIG. 7 illustrates an end cutaway schematic view of a glass ribbon forming apparatus and process including a cooling mechanism that includes both a convective cooling mechanism and conduits with a cooling fluid flowing therethrough in accordance with embodiments disclosed herein.

FIG. 7 illustrates an end cutaway schematic view of a glass ribbon forming apparatus and process including a cooling mechanism that includes both a convective cooling mechanism, illustrated by cooling fans 220, and conduits 210 with a cooling fluid flowing therethrough in accordance with embodiments disclosed herein. In the embodiment illustrated in FIG. 7, closeable openings 204 comprise hinged openings that are shown in FIG. 7 as being in an open position. In such a configuration, closeable openings 204 can act as a barrier between upstream and downstream heat transfer regimes in housing 200, wherein upstream and downstream heat transfer regimes are shown in FIG. 7 as being separated by dashed line 250, wherein, in upstream heat transfer regime, side wall 202 is between glass ribbon 58 and conduits 210 and, in downstream heat transfer regime, a direct view exists between glass ribbon 58 and conduits 210. In the embodiment illustrated in FIG. 7, fluid flowing through conduits 210 associated with upstream heat transfer regime and conduits 210 associated with downstream heat transfer regime may be the same or different. For example, in certain embodiments, fluid flowing through conduits 210 associated with upstream heat transfer regime may be a gas, such as air, and fluid flowing though conduits 210 associated with downstream heat transfer regime may be a liquid, such as water.

While embodiments herein have been disclosed with respect to various cooling mechanisms, it is to be understood that such embodiments, wherein a side wall of a glass manufacturing apparatus comprises at least one closeable opening, may also be used with various heating mechanisms, such as electrical resistance heating mechanisms and induction heating mechanisms to name a few.

In addition, while embodiments herein have been illustrated with two conduits 210 on each side of housing 200, it is to be understood that embodiments disclosed herein include those having any number of conduits on each side of a housing, such as at least one conduit, at least two conduits, at least three conduits, and so forth. Moreover, embodiments disclosed herein include those in which any number of conduits may be situated upstream or downstream of a closeable opening and include those in which any number of conduits that are situated in a position that allows for a direct view between the conduits and a glass ribbon when a closeable opening is open.

Embodiments disclosed herein can provide at least one of several advantages including, but not limited to, providing a thermal effect in smoothing thermal gradients experienced by the glass ribbon when the glass ribbon is at a relatively higher temperature and, hence, lower viscosity, while simultaneously providing increased heat transfer from the glass ribbon when the glass ribbon is at a relatively lower temperature and, hence, much higher viscosity, such as when there is a difference of at least one million poise between the viscosity of the glass ribbon at the relatively higher temperature and the viscosity of the glass ribbon at the relatively lower temperature. Such processing conditions can, in turn, enable the production of glass meeting stringent requirements for properties, such as thickness uniformity and/or surface flatness and waviness, while at the same time enabling glass ribbon that can be produced at higher flow rates and of glass compositions that are difficult to cool due to low specific heat capacity and/or emissivity.

While the above embodiments have been described with reference to a fusion down draw process, it is to be understood that such embodiments are also applicable to other glass forming processes, such as float processes, slot draw processes, up-draw processes, and press-rolling processes.

It will be apparent to those skilled in the art that various modifications and variations can be made to embodiment of the present disclosure without departing from the spirit and scope of the disclosure. Thus it is intended that the present disclosure cover such modifications and variations provided they come within the scope of the appended claims and their equivalents.

What is claimed is:

1. An apparatus for manufacturing a glass article comprising:
   a cooling mechanism;
   a housing comprising an interior area defined between a first side wall and a second side wall, wherein the first side wall extends between the interior area and the cooling mechanism, and the cooling mechanism is configured to isolate a first cooling fluid within the cooling mechanism from fluid communication with the interior area; and
   a first closeable opening in the first side wall, wherein the first closeable opening and the cooling mechanism are configured to allow a greater amount of heat to be transferred from a glass ribbon traveling within the interior area when the first closeable opening is open than when the first closeable opening is closed.

2. The apparatus of claim 1, further comprising a second closeable opening in one of the first and second side walls.

3. The apparatus of claim 2, wherein the first closable opening and the second closable opening are each configured to be independently opened or closed.

4. The apparatus of claim 2, wherein the second closable opening, with reference to a flow direction of the glass ribbon, is positioned downstream from the first closable opening.

5. The apparatus of claim 4, wherein the second closable opening is in the first side wall.

6. The apparatus of claim 2, wherein the first closable opening and the second closable opening are each elongated and configured to be elongated along a widthwise direction of the glass ribbon.

7. The apparatus of claim 2, wherein the first closable opening and the second closable opening are each elongated and configured to be elongated along a widthwise direction of the glass ribbon.

8. The apparatus of claim 1, wherein the cooling mechanism comprises a first conduit configured to isolate the first cooling fluid within the cooling mechanism from fluid communication with the interior area, the first conduit situated along the first side wall.

9. The apparatus of claim 8, wherein the cooling mechanism further comprises a second conduit configured to isolate a second cooling fluid within the cooling mechanism from fluid communication with the interior area, the second conduit situated along the first side wall in a position that allows for a direct view through the closable opening when the closable opening is open, and the second conduit is situated downstream of the first conduit with reference to a flow direction of the glass ribbon.

10. The apparatus of claim 8, wherein the cooling mechanism further comprises a second conduit configured to isolate a second cooling fluid within the cooling mechanism from fluid communication with the interior area.

11. The apparatus of claim 10, wherein the second conduit is situated along the first side wall.

12. The apparatus of claim 11, wherein the second conduit is situated downstream of the first conduit with reference to a flow direction of the glass ribbon.

13. An apparatus for manufacturing a glass article comprising:
a convective cooling mechanism comprising at least one vacuum port configured to promote convection cooling of a glass ribbon with a cooling fluid flow generated at least partially by operation of the at least one vacuum port;
a housing comprising an interior area defined between a first side wall and a second side wall, the first side wall extending between the interior area and the convective cooling mechanism, and an inlet of the at least one vacuum port is spaced away from the first side wall; and
a first closeable opening in the first side wall, wherein the first closeable opening and the convective cooling mechanism are configured to allow a greater amount of heat to be transferred from the glass ribbon traveling within the interior area when the first closeable opening is open than when the first closeable opening is closed.

14. The apparatus of claim 13, further comprising a second closeable opening in one of the first and second side walls.

15. The apparatus of claim 14, wherein the first closable opening and the second closable opening are each configured to be independently opened or closed.

16. The apparatus of claim 14, wherein the second closable opening, with reference to a flow direction of the glass ribbon, is positioned downstream from the first closable opening.

17. The apparatus of claim 14, wherein the first closable opening and the second closeable opening are each elongated and configured to be elongated along a widthwise direction of the glass ribbon.

18. The apparatus of claim 17, wherein the second closable opening is in the first side wall.

19. The apparatus of claim 14, wherein the first closable opening and the second closeable opening are each elongated and configured to be elongated along a widthwise direction of the glass ribbon.

* * * * *